May 21, 1968 W. R. OLSON ET AL 3,384,761

ASYNCHRONOUS TIMING CHAIN EMPLOYING BISTABLE STAGES, EACH STAGE COMPRISING STORAGE FLIP-FLOP AND TRANSFER-TRAP FLIP-FLOP

Filed June 25, 1965 3 Sheets-Sheet 1

INVENTORS
WAYNE R. OLSON
RICHARD M. OMAN
BY Charles A. Johnson
ATTORNEY

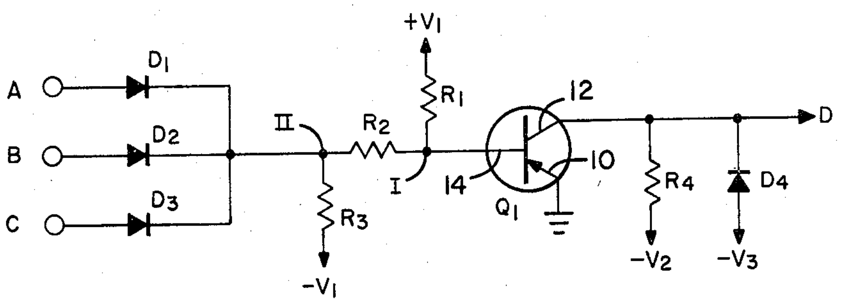
Fig. 2
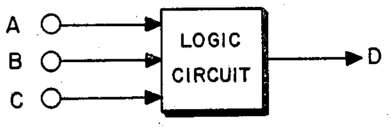
Fig. 3
| D | A | B | C |
|---|---|---|---|
| 1 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
Fig. 4a
H = HIGH
= 0 VOLTS
= LOGICAL 1
L = LOW
= -3 VOLTS
= LOGICAL 0
| D | A | B | C |
|---|---|---|---|
| H | L | L | L |
| L | L | L | H |
| L | L | H | L |
| L | L | H | H |
| L | H | L | L |
| L | H | L | H |
| L | H | H | L |
| L | H | H | H |
Fig. 4b
INVENTORS
WAYNE R. OLSON
RICHARD M. OMAN
BY Charles A. Johnson
ATTORNEY May 21, 1968 W. R. OLSON ET AL 3,384,761

ASYNCHRONOUS TIMING CHAIN EMPLOYING BISTABLE STAGES, EACH STAGE COMPRISING STORAGE FLIP-FLOP AND TRANSFER-TRAP FLIP-FLOP

Filed June 25, 1965 3 Sheets-Sheet 3

INVENTRS
WAYNE R. OLSON
RICHARD M. OMAN
BY Charles A. Johnson
ATTORNEY

United States Patent Office 3,384,761

Patented May 21, 1968

3,384,761
ASYNCHRONOUS TIMING CHAIN EMPLOYING BISTABLE STAGES, EACH STAGE COMPRISING STORAGE FLIP-FLOP AND TRANSFER-TRAP FLIP-FLOP

Wayne R. Olson, St. Paul, and Richard M. Oman, Roseville, Minn., assignors to Sperry Rand Corporation, New York, N.Y., a corporation of Delaware Filed June 25, 1965, Ser. No. 466,965
13 Claims. (Cl. 307—224)

ABSTRACT OF THE DISCLOSURE

A signal responsive circuit having a plurality of indicating stages is described. The circuit includes between each of the stages a temporary storage device, each of which is operable for simultaneously trapping an advance pulse, clearing the preceding stage, transferring the advance pulse for setting the next subsequent stage, and inhibiting the effectiveness of the advance pulse on all other stages.

In many digital systems, there is a need for ring counters, which are often referred to as commutators, shift registers, or arrangements of circuitry referred to as timing chains for providing a pulse on each of a number of output leads in succession. Such pulses can be utilized for example, in memory applications where it is desired to select rows in a memory sequentially, or in the control section of a digital computer having a predetermined control sequence of executing instructions whereby it is necessary upon the occurrence of a designated control signal to initiate in order the execution of each of the program sequences. These sequences may include procuring operands from memory, performing the required arithmetic operation, and restoring the result to memory. The sequential output signals may be desired in a fixed time relationship, often referred to as synchronous, or they may be required in what may be termed an asynchronous relationship. That is, the activating control pulse which determines the necessity of a given stage providing the desired output signal may come asynchronously in time with respect to previously received control pulses.

A ring counter, or commutator, may be defined as a circuit loop of interconnected bistable devices such that one and only one of said devices is in a specified state of operation at any given time. The results in an effective operation such that as input signals are applied they are counted by moving the position of the one specified state in an ordered sequence around the loop. A bistable device is a device having two stable-states of operation. Various terms are used to indicate the two states. For one of the states, the following terms are included: set, active, 1-state, high states, indicating, etc., and for the other of the two states, terms such as cleared, inactive, 0-state, low-state, non-indicating, etc., are used. The words respectively are used to provide descriptive terms for electrical activity of the bistable device. A bistable device normally has at least two input terminals each of which corresponds with one of the two states. A bistable device will remain in either state until caused to change to the other state by the application of a signal to the appropriate input terminal for causing the condition to change. Since the circuits are bistable, they are often referred to as storage circuits. The prior art has proposed and provided various circuits combinations for providing ring counters at timing chains which operate at a fixed frequency of advancing along the chain. Various circuit arrangements have been developed for use intermediate the stage circuits for inhibting transfer down the chain until the associated stage has been set, and for clearing out a stage upon the application of a subsequent advance pulse. Some of the prior art circuits require the utilization of bipolar control pulses. Others of the prior art have their operation dependent upon a critical arrangement of the control pulses with respect to time relationship and input signal wave shape. Some of these critical pulses include two-phase or multiple phase clock sources. Accordingly, in prior art ring counters using gating circuits to interconnect the bistable devices, it has been necessary to limit the duration, or period of time each control signal is present and applied as an input to the counting circuit.

It is often desired to produce a specified output signal at a frequency which bears a predetermined relationship to the repetition rate of the pulses which are applied to the input terminals of the counting circuit. The frequency of the output signal thus produced, most commonly is referred to as a sub-multiple of the frequency of the input pulses. Efficient frequency reduction or division, often referred to as scaling, can be accomplished according to the concepts of this invention. Counters of this type find use in performing arithmetic manipulations in number systems other than the conventional binary system, for instance decimal, quinary, ternary, bi-quinary, etc. In these systems the nature of the number system would dictate the number of stages to be employed. For example, if a decimal system is required, ten stages could be employed such that ten input pulses would be required to achieve an output pulse from the tenth stage.

For convenience of discussion, it can be considered that in the timing circuit a first stable state referred as the set state will be activated sequentially through the stages, and that all of the remaining stages in the timing chain will be in the other stable-state, referred to as the cleared state. This is an arbitrary illustrative means of description for providing convenient terminology for use in the description of the circuit operation. It is readily understood that this arbitrary notation is not limitative.

The means for interconnecting the bistable devices of the asynchronous timing chain described and claimed herein are designated transfer-traps and will be described in more detail below. A transfer-trap, when interconnecting two bistable devices, may be connected to the preceding device so that when the preceding device is in the inactive or zero state, the transfer-trap is in a condition so that it will not produce a setting output signal when a control signal, or advance pulse, is applied to the transfer-trap. When the preceding bistable device is in the active or one state, the transfer-trap will be in an operative condition that will produce a control signal when an advance pulse is applied which will simultaneously cause the subsequent stage to be switched to the active or one state and the preceding bistable device to be switched to the inactive or zero state. The transfer-trap of a given stage is also coupled to the transfer-trap of the subsequent stage in a manner to inhibit the alteration of the state of the bistable device unless the bistable device associated with the first mentioned transfer-trap is in the one or active condition.

When the transfer-trap circuits are used in timing circuits, it is not longer necessary to strictly limit the duration of each advance pulse, or to control the time relationship of the occurrence of the advance pulses. This is no need to provide internal delay circuits such as are required in many prior art ring counters for delaying the change of condition of each state of the counter, or to incorporate expensive pulse standardizing circuits for the counter. Beyond providing minimal duration, advance pulses required to switch the state of the bistable element, the width of the advance pulse is not critical in the operation of the circuitry, and the asynchronous timing chains and scaling circuits incorporating the transfer-trap circuitry will operate with advance pulses having widths of indefinite duration. Further, the advance pulses can be provided at a repetition rate limited only by the duration required to switch a bistable element.

The primary object, therefore, of this invention is to provide an improved electronic control circuit.

It is a further object of this invention to provide an improved timing chain.

Another object of this invention is to provide an improved scaling circuit.

It is still a further object of this invention to provide an asynchronous timing chain using transfer-trap circuitry between the bistable devices of the timing chain.

It is yet another object of this invention to provide an asynchronous timing chain having transfer-trap circuitry intermediate each bistable state of the timing chain for simultaneously clearing the previously set stage, setting the next subsequent stage, and temporarily storing a signal indicative of the condition of the asynchronous timing chain.

It is a still further object of this invention to provide an improved asynchronous timing chain in which the duration of each advance pulse is not critical on the operation of the timing chain.

A still further object of this invention is to provide an asynchronous timing chain having transfer-trap circuitry intermediate each bistable state of the timing chain where the transfer-trap circuitry inhibits the advance pulse from rippling down the timing chain.

Yet another object of this invention is to provide an improved bistable stage and transfer-trap circuit for use in timing or scaling circuits.

Another object of this invention is to provide an improved ring counter.

Other objects and advantages of this invention will be disclosed in the course of the following specification, reference being had to the accompanying drawings, in which:

FIG. 2 is a schematic diagram of the two-state basic building-block circuit utilized in describing one embodiment of the invention;

FIG. 3 is the logic block symbol of the circuit illustrated in FIG. 2.

Figure 7:
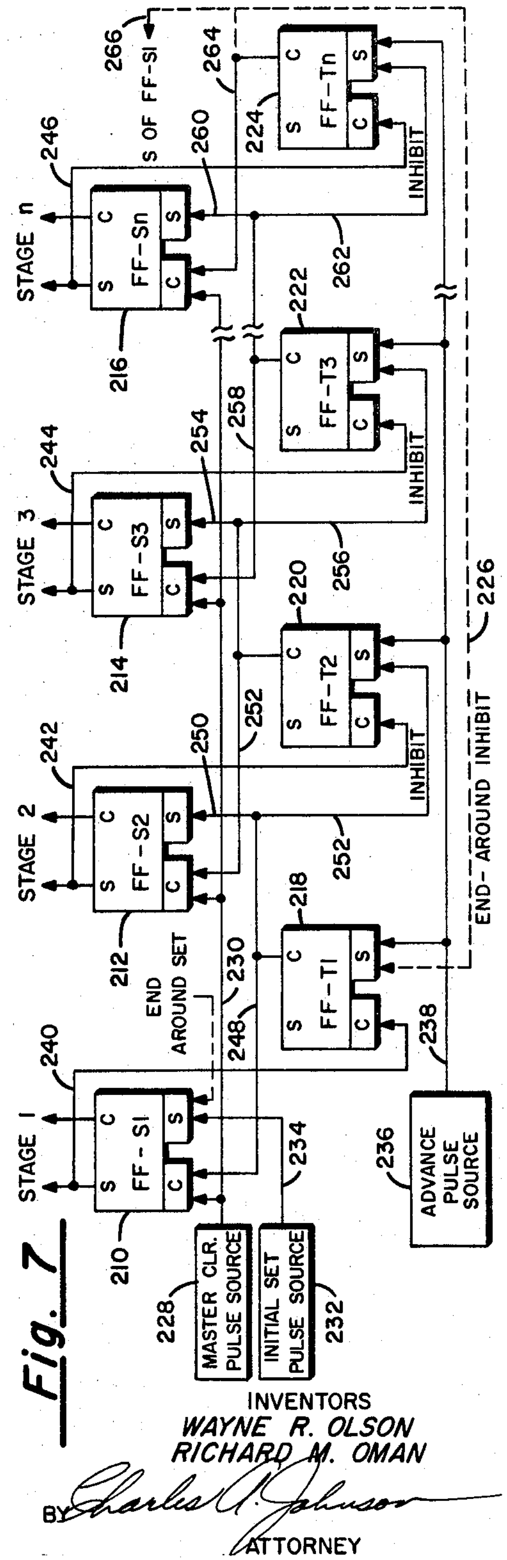
Figure 5:
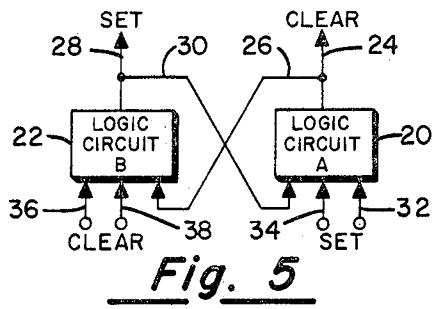
Figure 6:
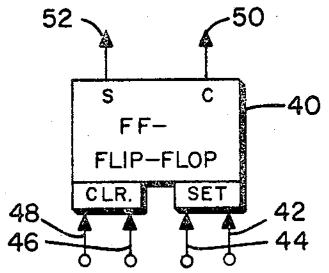

FIGS. 4*a* and 4*b* are truth-tables defining the operation of the circuit shown in FIG. 2;

FIG. 5 illustrates a bistable arrangement of two circuits of the type illustrated in FIG. 2 comprising a cross-coupled bistable flip-flop;

FIG. 6 illustrates the logic block symbol of a flip-flop;

FIG. 7 is a logic block diagram of an *n* stage asynchronous timing chain; and

Figure 8:
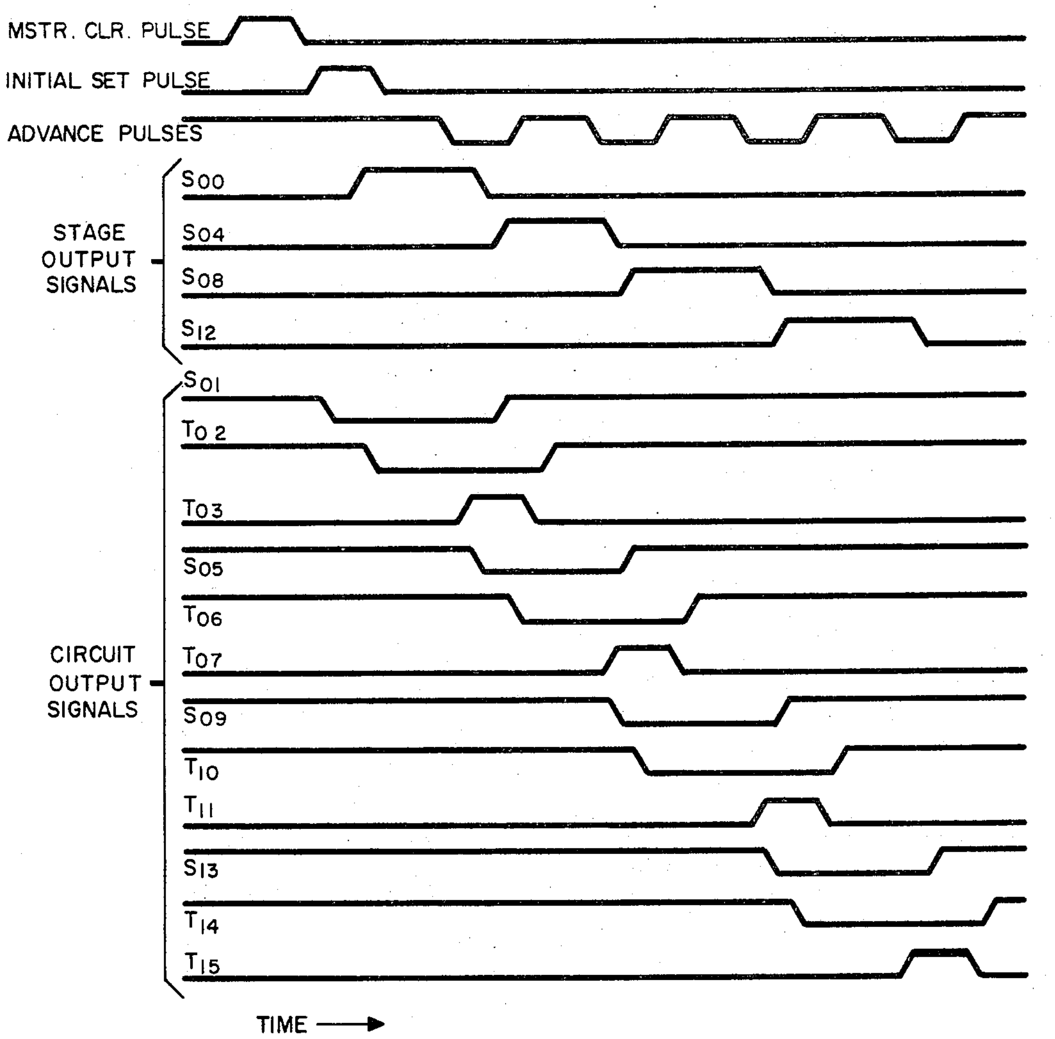

FIG. 8 is a signal diagram illustrating the relationship of the output signals of the respective timing chain stages to the application of the advance pulses.

At the outset, the basic two-state circuit which is utilized as a building block to construct the bistable stages of the asynchronous timing chain and the transfer-trap circuitry will be explained. By utilizing interchangeable building block circuits for performing the logic operations, the logic of the asynchronous timing chain and control circuitry can be understood from a block logic diagram discussion rather than necessitating the consideration of each detail circuit component. For illustrative purposes of this embodiment, the binary logic can be considered as having two signal values for representing binary one and binary zero. Since the circuit has two operative states, conducting and non-conducting, it is termed a two-state logic circuit. In this case, a high level is represented by zero volts and is utilized to indicate a logical 1 signal. A low value is represented by −3 volts and is used to indicate a logical 0. The manner in which the circuit in FIG. 2 operates on input signals is illustrated in FIG. 4*a* and FIG. 4*b*. It can be seen that to provide a logical 1 output signal (high), it is necessary that all input signals be low or logical 0. In a similar manner, it can be seen that a low (logical 0) output signal will be developed if any or all of the input signals are of the high (logical 1) state.

Turning now to a brief description of the circuit operation of the building block shown in FIG. 2, it can be seen that three input terminals labeled A, B, and C are illustrated. This is illustrative only and limitation thereto is in no way intended. The number of input terminals can vary from one, which would result in the circuit operating as a simple inverter, on upward within the fan-in limits. Transistor Q1, which is of the PNP type, has three electrodes, namely the emitter 10, the collector 12, and the base 14. For this embodiment, the emitter is coupled to ground and the collector is coupled to the output terminal D. A voltage divider network comprised of resistors R1, R2, and R3 is coupled between voltage sources +V1 and −V1. The base 14 is coupled to the junction labeled I of resistors R1 and R2. The collector 12 is coupled to one end of resistor R4, with the other terminal of resistor R4 being coupled to voltage supply −V2. Also coupled to the collector is one terminal of voltage limiting diode D4. The other terminal of D4 is coupled to voltage −V3 and operates to clamp the output signal. For this illustration the low signal has been shown as −3 volts, and it is this value which is the value of supply −V3. Diodes D1, D2, and D3 have their anodes respectively coupled to input terminals A, B, and C. The cathode terminals of diodes of D1, D2, and D3 are coupled to a common point which in turn is coupled to point II intermediate resistors R2 and R3. The values of the resistors in the divider R1, R2, and R3 are chosen so that point I causes the base of transistor Q1 to be biased such that the transistor is turned off. This divider network puts a reverse bias on the emitter-base junction. The voltage level at the base when the transistor is turned off is at, or slightly positive from, the potential applied to the emitter 10. With the transistor turned off, the signal applied at output terminal D is the value −V3, or for this embodiment −3 volts. A high (ground) signal on any of the inputs A, B, or C raises point II to nearly ground level since the forward voltage drop across unidirectional conducting diodes is very small. A low signal (−3 volts) on each input terminal A, B, and C causes point II to be lowered to approximately −3 volts. This operates to cause point I to be brought below ground level, and biases transistor Q1 in a manner to cause it to conduct. When transistor Q1 is caused to conduct, a very minimal voltage drop is detected across the emitter-collector circuit and output terminal D provides approximately ground potential, or a logical 1. For purposes of the foregoing discussion leakage currents in Q1 are ignored. In summary, then, it can be seen that if any signal applied to input terminals A, B, or C is of a high level, the output level will be low; and, that only when all input signals are low will the output signal be high. When the circuit is coupled into a logic array, output terminals such as D will be coupled directly to the input terminal of another similar circuit. The values of R1, R2, R3, and R4 will be dependent upon the selection of the voltage values +V1, −V1, −V2, and −V3, hence specific examples will not be given, it being understood that the values be selected to operate in a manner described above in conjunction with the selected voltage sources.

The term NOR circuit is often used in the computer arts, and can be defined as a circuit which provides an output signal only when all of the input signals are absent. Considering the logical 1 and logical 0 designations of FIG. 4*a*, it can be seen that a logical 1 is provided only when all of the input signals are logical 0. It can be said then, that the circuit of FIG. 2 fulfills the terms of the definition and can be considered as a NOR circuit. This circuit can also be termed a positive-OR inverter, since any high (positive) pulse will cause a low, or inverted output signal. It should be understood that other circuits, such as negative-OR inverter circuits or circuits referred to as NAND circuits, could also be utilized to embody this invention, it being only necessary to reverse definitions of logical 1 and logical 0. It should be understood further that though a PNP transistor is illustrated, a NPN transistor could equally as well be utilized with the appropriate adjustments of bias and voltage levels.

The circuit described in FIG. 2 can be represented as a block labeled Logic Circuit, having a plurality of inputs A, B, and C and a single output terminal D as shown in FIG. 3. It should be understood that terminal D can be coupled to a plurality of related input terminals.

FIG. 5 illustrates a bistable flip-flop comprised of a pair of circuits of the type described in FIG. 2. These circuits are illustrated by Logic Circuit A, labeled 20, and Logic Circuit B, labeled 22. Block 20 has an output terminal 24 which is, for purposes of this description termed the Clear output terminal. Circuit 20 also provides via wire 26 an input signal to circuit 22. Circuit 22 has an output terminal 28, which is termed the Set output terminal. Circuit 22 also provides an input signal to circuit 20 via wire 30, thereby describing the cross-coupled flip-flop arrangement. Additionally, circuit 20 has input terminals 32 and 34. Again, only three inputs are shown for each circuit, but limitation thereto is in no way intended. Circuit 22 in a similar manner has input terminals 36 and 38. In operation, it will be seen that a high signal on either input terminal 32 or 34, termed the Set input terminals, will cause the output terminal of circuit 20 to exhibit a low signal. A limitation is normally placed on flip-flop circuits that a high signal cannot be applied simultaneously to both the Clear and Set sides. Such is not the situation with the transfer-trap flip-flop, and it will be noted below that high signals are momentarily applied to both the Set and Clear terminals. One of these will be terminated first and the flip-flop will be put in the state indicated by the remaining high signal. The low output signal from circuit 20 will be applied via wire 26 as an input signal to circuit 22. As just stated, terminals 36 and 38 will be maintained at the low level. Referring back to the truth-table of FIG. 4*b* it can be seen that when all input signals are low, the output signal is high. Therefore, circuit 22 will provide to output terminal 28 a high or Set signal. To clear the flip-flop, it is necessary to apply a high signal on either of Clear terminals 36 or 38. In a similar fashion a high signal on either of these terminals will cause the output terminal 28 to assume the low condition, and will cause a low signal to be applied via wire 30 as an input to circuit 20. As stated above, the flip-flop can have simultaneously applied thereto Clear and Set pulses, hence when terminals 32 and 34 have low signals impressed thereon, circuit 20 will be caused to provide a high signal to the Clear output terminal 24.

FIG. 6 is the logic block diagram representation of the flip-flop just illustrated in FIG. 5. Block 40 represents the cross-coupled logic circuits 20 and 22 of FIG. 5. The Set input terminals 42 and 44 correspond to Set input terminals 32 and 34 of FIG. 5, while the Clear input terminals 46 and 48 correspond to the Clear terminals 36 and 38. Terminal 50 is the Clear output terminal and terminal 52 is the Set output terminal.

Having described the normal modes of operation of the two-state building block logic circuit utilized to construct this embodiment, a consideration of the asynchronous timing chain will now be made, with particular attention being directed to FIG. 1. In most digital computers, it is common to provide a central timing signal source in the form of an oscillator. These oscillators are often crystal controlled circuits which provide an output signal having a closely regulated frequency. These oscillators are well-known in the art and for illustrative purposes the oscillator is shown as block 100. Since it does not form part of this invention, further description thereof will not be made. The oscillator output is normally provided on conductors, as indicated by conductor path 102, to pulse-shaper circuits indicated as block 104. These pulse shaper circuits normally operate on the oscillator wave form to provide a series of time-spaced pulses to the control section 106 of the computer. The circuitry which comprises the pulse shapers will not be described in detail since it does not form part of the invention. It is necessary only to say that the output from the pulse shapers will be applied on lines such as 108 and 110 in timed-space manner.

The Control Section 106 exerts the directing influence over the activities of the computer by controlling the timing of the various operations. The Control Section, in a stored programmed computer for instance, receives the instructions which the computer is to carry out, interprets them, and directs their execution upon the operands and data words specified. As stated above, all of the activities and operations which take place within the computer are synchronized by the central timing system which has been described as the oscillator 100 and pulse shapers 104. The Control Section will normally include circuitry which controls the addressing of the computer memory, circuitry for translating the designated functions to be performed as indicated by the instruction words, and circuitry for generating the timing of the various portions of the computer. As a part of the translating circuitry, the Control Section will normally provide pulses which will initiate activities of circuits separate from the Control Section; will provide gating pulses to permit the advance of information from register to register; and will generally provide the guiding control for the operations being performed. The Control Section circuitry is normally quite extensive and complex, and has many functions other than providing control of the asynchronous timing chain. Therefore, the detailed operation of the Control Section will not be made. Instead, it will merely be stated that pulses which are necessary to control the timing chain will be described, but the exact circuitry which generates these pulses will not be considered in detail. While the foregoing is described as apparatus for controlling the asynchronous timing circuit, it should be recalled that the source of advance pulses need not be closely controlled, it only being necessary to provide pulses within the limits of the circuit response time.

Turning now to a consideration of the detail operation of the asynchronous timing chain it can be seen that four stages are illustrated within dashed blocks. Within each of the dashed blocks there is shown four blocks, each representing a two-state logic circuit of the type described in FIG. 2, or its operating logical equivalent. In Stage 1 these circuits are labeled S00 and S01 and comprise the storage flip-flop, and T02 and T03 to comprise the transfer-trap. S00 provides an output signal via line 112 as an input signal to S01, and circuit S01 similarly provides an output signal on line 114 as an input signal to S00, thereby constructing the cross-coupled flip-flop of the type described in FIG. 5. In the same manner, the transfer-trap has cross-coupling leads 116 and 118. Each of the subsequent stages are similarly constructed and it can be seen that Stage 2 has circuit S04 cross-coupled with S05 by conductor paths 120 and 122. Circuits T06 and T07, which comprise the Stage 2 transfer-trap, are cross-coupled by conductors 124 and 126. In Stage 3 the storage flip-flop, which is comprised of circuits S08 and S09, are cross-coupled by conductors 128 and 130. The transfer-trap flip-flop for Stage 3 is comprised of logic circuits T10 and T11, which are cross-coupled by conductors 132 and 134. Stage 4 has its storage flip-flop comprised of circuits S12 and S13, which in turn are cross-coupled by conductors 136 and 138. The Stage 4 transfer-trap is comprised of circuits T14 and T15 which are cross-coupled via wires 140 and 142. The following discussion will illustrate that the number of stages can be extended on as far as desired. The discussion of four stages is believed sufficient to gain an understanding of the inventive concept.

Each storage flip-flop is arranged for receiving a master clear pulse from the Control Section 106 via master clear bus 144. If advance pulses are free-running, it is necessary only to clear the first stage and any signals in the counter will run off the end. Ring counters require clearing of all stages. For this embodiment, the master clear pulse is a high or ground potential pulse applied to circuit S00 via conductor 146, to S04 via conductor 148, to S08 via conductor 150, and to S12 via conductor 152. The master clear pulse causes all of indicating flip-flops to be switched to the Clear state.

Each of the just mentioned circuits in the storage flip-flops provide an output signal to a respective utilization device. The utilization device may be the Control Section or some other circuitry in a computer which is to be timed. Since the utilization devices may be any of a wide variety of circuits, no specific showing is made. In Stage 1, circuit S00 provides the output signal on conductor 154 to the utilization device; and, additionally, provides the output signal via conductor 156 as a control signal to circuit T02 of the Stage 1 transfer-trap circuitry. In Stage 2 circuit S04 provides its output signal on conductor 158 to its associated utilization device; and, additionally, as a control signal on conductor 160 to transfer-trap circuit T06. In Stage 3 the output signal from circuit S08 is applied on conductor 162 to its utilization device, and as a control signal on conductors 164 to transfer-trap circuit T10. Finally, in Stage 4 the S12 circuit provides output signals on conductor 166 to its utilization device, and as a control signal on conductor 168 to transfer-trap circuit T14. When the Control Section 106 issues a Master Clear pulse on conductor 144, each of the stages indicated is caused to provide a low (logical 0) signal respectively on conductors 154, 158, 162, and 166. Output signals (to utilization devices) can be usefully obtained from all four logic circuits in each stage, each with distinct properties.

Each of the stages has a further internal coupling from the transfer-trap circuitry to the storage circuitry. In Stage 1 it can be seen that circuit T03 provides its output signal on wire 170 as an input signal to circuit S00. In a similar manner Stage 2 has circuit T07 with its output circuit coupled via wire 172 to the input circuit of circuit S04. In Stage 3 circuit T11 has its output circuit coupled via conductor 174 to the input circuit of circuit S08. Finally, in Stage 4, circuit T15 provides its output signal on conductor 176 to the input circuit of circuit S12.

The intercoupling between these stages are from the transfer-trap circuitry to the subsequent stage's storage circuit and the subsequent stage's transfer-trap circuit. It can be seen in Stage 1 that the output signal from circuit T03 is provided on conductor 178 as an input to the Stage 2 storage flip-flop, specifically being circuit S05. Additionally, the output signal from circuit T03 is provided on inhibit line 180 as an input signal to the Stage 2 circuit T07 of the Stage 2 transfer-trap flip-flop. The coupling between Stage 2 and Stage 3 has the output signal from circuit T07 of Stage 2 coupled to the input circuit of circuit S09 via conductor 182. Additionally, it is provided on the inhibit line 184 as an input signal to circuit T11. The coupling between Stage 3 and Stage 4 is accomplished in a similar manner, and has the output signal of circuit T11 carried on conductor 186 as an input signal to circuit S13 of Stage 4; and, additionally, carried on inhibit line 188 as an input signal to circuit T15. If higher ordered stages are to be included, the output signal from T15 is provided on conductor 190 in a manner similar to that just described. In the event that the asynchronous timing chain is to have a circular operation, that is if upon the reaching of the highest order stage the count is to return to the lowest order stage upon the subsequent advance pulse, it is necessary to supply an end-around inhibit line from the highest order of transfer-trap stage via conductor 192, shown as dash line, to provide an input signal to a Stage 1 circuit T03. Further, the highest order transfer-trap stage (for this embodiment circuit T15) must be coupled to the input circuit of S01, as shown by dashed line 193. If the counter is to count its full capacity and then terminate, the end-around inhibit and end-around set are not required.

The advance pulses necessary to advance the count from stage to stage are provided for this embodiment from the Control Section 106. It should be noted that any source of advance pulses can be utilized. For this embodiment, the advance pulse is a low signal (logical 0). The Control Section provides the advance pulses on bus 194 as a simultaneous input signal to the transfer-trap circuitry of each of the stages. In Stage 1 the advance pulse is provided as an input signal on conductor 196 to circuit T03. In Stage 2 the advance pulses are applied on conductor 198 as input signals to circuit T07. In Stage 3 the advance pulses are applied as input signals to circuit T11 via conductor 200. Finally, the advance pulses are applied on conductor 202 as input signals to circuit T15. Any additional higher order stages would receive similar advance pulses.

The lowest order stage requires that an Initial Set pulse be provided to the S01 circuit. The Initial Set pulse for this embodiment is a high (ground potential) pulse and is applied from the Control Section 106 via conductor 204. This high input signal operates to cause circuit S01 to provide a low signal on conductor 114 as an input signal to circuit S00, irrespective of the signal state on conductor 112. It will be noted that the advance pulse bus 194 is normally held high. This causes circuit T03 to provide a low signal on conductor 170. It will also be noted that the Master Clear bus 144 is normally held low, except during the clearing operation, therefore providing a low signal on conductor 146. The combination of the low signals on conductors 114, 146 and 170 provides the controlling inputs to circuit S00. It can be seen from a consideration of the truth table of FIG. 4*b* that when all input signals are low the output signal will be high. Therefore, the application of an Initial Set pulse ultimately results in a high (logical 1) pulse being provided as an output signal on conductor 154. Additionally, the high pulse now provided on conductor 154 will be provided as a control input signal to circuit T02 via conductor 156. Again, referring to the truth table in FIG. 4*b* it will be noted that a high signal on any input line will cause the output signal of the circuit to be a low signal. Therefore, when the Initial Set pulse has been applied, and has propagated through the S00 and S01 circuitry, it will result in the output signal on the conductor 116 of circuit T02 to be a low signal. The output signal from circuit T03 provided on line 118 is low, but has no effect on the operation of T02. Upon the subsequent application of a low advance pulse on bus 194, it will be seen that the input signals T03 on conductors 116 and 196 are both of the low type, hence resulting in a high signal on conductors 118, 170, 178, and 180. The high signal on conductor 170 will operate irrespective of the other input signals to circuit S00 to cause circuit S00 to exhibit a low output signal on conductor 154 and conductor 112. By this time, the Initial Set pulse has been terminated so that a low signal is impressed on conductor 204 as an input signal to circuit S01. The combination of the low signals on conductors 112 and 204 causes the output signal from S01 to become high and applied as an output signal on conductor 114. This indicates that the state of the Stage 1 storage flip-flop comprised of S00 and S01 has switched from the Set to the Clear state. This has also caused the initially set high pulse, which was provided on conductor 154 to be switched to the low state (logical 0) as applied to the utilization device. The application of the low output signal as a control signal on line 156 is applyied as an input signal to T02. The output signal from T02 on conductor 116 remains at a low level due to the high signal on line 118, thereby causing the output signal from T03 on conductors 118, 170, 178, and 180 to remain in the high state until the advance pulse returns to the high state. This results in T03 providing a low signal on line 170, and the storage flip-flop S00 and S01 is cleared.

The initial high output signal from T03 is applied via conductor 178 as a setting input signal to S05. The high input signal to S05 results in a low signal on conductor 122. The high signal output of T03 available when the first advance pulse is initially applied is also applied via inhibit line 180 as an input signal to circuit T07 and operates to hold the output signal of T07 in the low condition thereby preventing the first application of the advance pulse from propagating down the timing chain. In a manner similar to that just described, the Stage 2 storage flip-flop comprised of circuits S04 and S05 is Set. Circuit S04 provides a high signal on lines 158 and 120 and a low output signal is derived from S05 on line 122. The output signal of S04 coupled as a control signal via conductor 160 as an input signal to circuit T06 is also a high signal at this time. This high input signal to T06 results in a low output signal on conductor 124 which is applied as an input to T07. When the first advance pulse terminates and the bus level 194 returns to the high condition, circuit T03 is caused again to revert to providing a low output signal on conductors 118, 170, 178, and 180. The occurrence of the low signal on inhibit line 180 operates to remove the inhibiting condition and to condition the transfer-trap circuit of Stage 2, which is comprised of circuit T06 and T07, in a manner where the second advance pulse will be allowed to enter Stage 3 and alter its condition. It has already been described that the input signals to circuit T07 on conductor 124 is low, and now the input on inhibit line 180 is low, thereby providing the condition that upon the application of the second advance pulse on conductor 198 as a low signal the output signal from circuit T07 will be caused to become high. The high signal on conductor 172 operates to Clear Stage 2 by switching circuit S04 to provide a low output signal on conductor 158 to the utilization device, and to Set Stage 3 in a manner similar to that just described.

From the foregoing, then, it can be seen that after the Initial Set condition has been provided in Stage 1, the occurrence of an advance pulse operates simultaneously to clear the storage flip-flop of Stage 1 to provide a logical 0 or low output signal to the utilization device on conductor 154, to remove the inhibit signal for Stage 2, and to cause Stage 2 to be switched to the Set condition whereby a high or set signal is provided as an output signal from circuit S04 on conductor 158 to its associated utilization device. It will be seen also that the duration of the Set output signal provided to respective utilization devices will be independent of the duration of the respective advance pulses. The operation just described is repeated for each subsequent stage upon the application of each subsequent advance pulse on bus 194.

Figure 1:
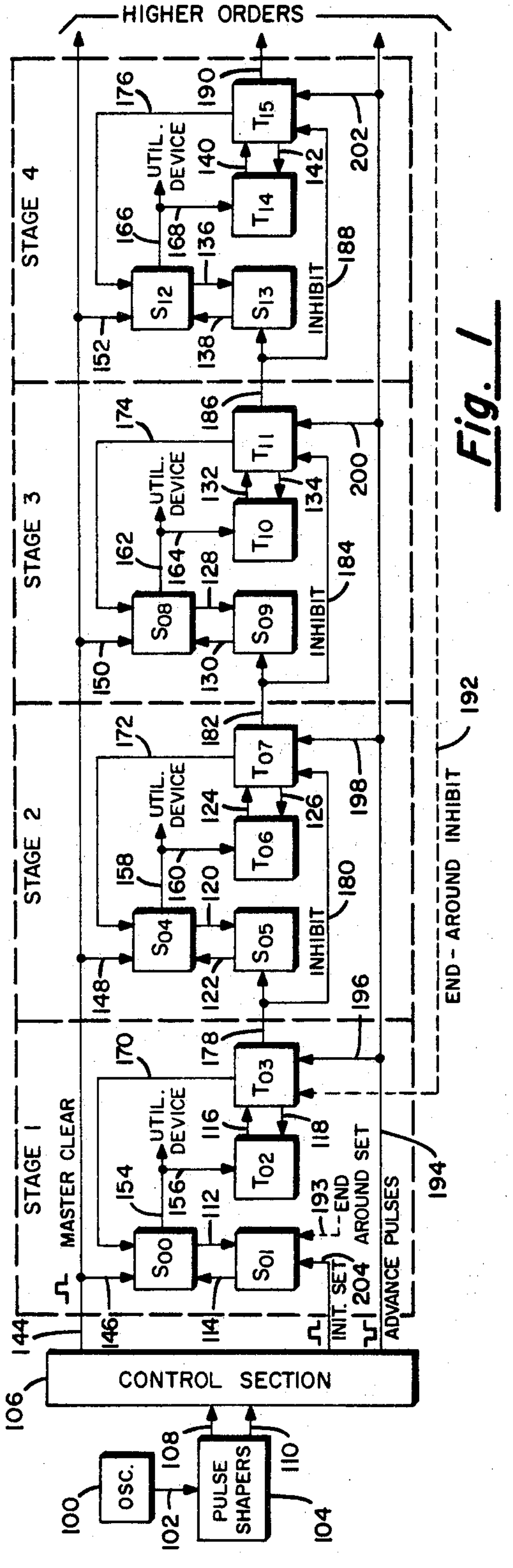
FIG. 1 is a schematic block diagram of a four-stage asynchronous timing chain constructed in accordance with the concepts of this invention.

FIG. 8 is a timing diagram which illustrates the relationship of the Master Clear signal, the Initial Set signal, the advance pulses and the various output signals from the circuits which comprise the asynchronous timing chain illustrated in FIG. 1. The timing diagrams are somewhat idealized and the rise and fall time of the pulses are shown somewhat exaggerated so that the relationship of the various signals can more readily be understood. It will be noted that there is no time scale. This follows because the operation of the asynchronous timing chain is, as the name implies, asynchronous, and the speed of operation is only limited by the inherent delays of the circuitry employed and the occurrence of the advance pulses. It will be recalled that the period over which each of the output stages S00, S04, S08, and S012 are retained in the Set or logical 1 condition is independent of the duration of the respective advance pulses. The advance pulses illustrated are shown occurring uniformly, that is at fixed intervals. It should be noted that the next subsequent advance pulse can come as soon or as long after an advance pulse as is desired for the particular control function, and that the operation of the transfer-traps will be to recall the status of the timing chain and only permit the count to advance when the next advance pulse is received. It has been stated that the maximum repetition frequency of the occurrence of the advance pulses is limited to the switching speeds of the particular circuits being employed, that is the advance pulse duration need only be great enough to switch a flip-flop. This can be seen from the following consideration. If it is assumed that the average delay through one of the circuits of the type described in FIG. 2 is a time factor $t$, and if it is assumed for instance considering Stage 2 that the inhibit line 180 is conditioned to allow Stage 2 to be set, then upon the occurrence of an advance pulse on line 198 that there will be first delay $t$ through circuit T07 and a second delay $t$ through circuit S04 so that the utilization device feels the effect of the advance pulse within two circuit delay times. A third delay time $t$ is required to propagate through the circuit T06 and finally a fourth delay time $t$ is needed to reset circuit T07. From the foregoing it can be seen that a minimum of four circuit delay periods must be provided between subsequent applications of advance pulses.

Having considered the detail operation of a four stage asynchronous binary counter as shown in FIG. 1, a consideration of FIG. 7 is a more generalized block diagram of an $n$ stage timing chain which incorporates the inventive concepts. In the block diagram representation, the logic circuits discussed individually in consideration of FIG. 1 are shown as the flip-flops with the block symbol as described in FIG. 6. The storage flip-flops are labeled on their face FF–S1, labeled 210; FF–S2, labeled 212; FF–S3 labeled 214; and FF–S$n$, labeled 216. These are the storage flip-flops of the timing chain and provide the respective sequential output signals on the Set or S conductors. The transfer-trap flip-flops illustrated as FF–T1, labeled 218; FF–T2, labeled 220; FF–T3, labeled 222; and FF–T$n$ labeled 224, are intercoupled with their respective storage flip-flops in a manner similar to that described in relation to FIG. 1. FIG. 7 illustrates that the circuit for implementing the invention is not limited to a particular circuit type, but instead can be constructed of flip-flops, when coupled together as illustrated, so that an $n$ stage counter can be readily accomplished. Additionally, it can be seen by including dashed return lines 226 and 266 that the timing chain can provide an end-around operation as described above. Alternatively, the timing chain can be counted through its full capability and for subsequent operation to be carried through the Master Clear, Initial Set, and then the application of the requisite number of advance pulses.

A Master Clear Pulse Source 228 is shown coupled to the respective storage flip-flops. The Master Clear input pulse is applied to the Clear input labeled C, circuitry for the respective flip-flop and operates to force each of the storage flip-flops FF–S1 through FF–S$n$ into the cleared condition. The Master Clear pulse is applied via clear bus 230. An Initial Set pulse source 232 is coupled via wire 234 to the Set, or S, input circuitry of the Stage 1 storage flip-flop FF–S1. This functions as described above. An advance pulse source 236 is coupled via bus 238 to the Set, or S, input circuitry of the transfer-trap flip-flops. The Set output terminals, labelel S, of each of the storage flip-flops are coupled to the Clear input terminals of their associated transfer-trap flip-flops. For Stage 1 this connection is shown by wire 240, for Stage 2 by wire 242, for Stage 3 by wire 244, and for Stage $n$ by wire 246. The Clear output terminals of the respective transfer-trap flip-flops are respectively coupled to the Clear input circuits of the associated storage flip-flop; to the Set input circuit of the next subsequent storage flip-flop and to the Set input circuit of the next subsequent transfer-trap flip-flop. For FF–T1 these connections are shown respectively as wires 248, 250, and 252; for FF–T2 as wires 252, 254, and 256; for FF–T3 respectively as wires 258, 260, and 262; and for FF–T$n$ it will be noted that only the clear wire 264 is shown. Dashed lines 226 and 266, previously mentioned, would accomplish the end-around inhibit function and Set operation required for the end-around counting operation if desired.

From the foregoing it is apparent that the various purposes and objectives of this invention have been achieved, and have been described in detail. It is understood that suitable modification may be made in the structure as disclosed provided such modifications come within the spirit and scope of the appended claims. Having now, therefore, fully illustrated and described the invention, what is claimed to be new and desired to be protected by Letters Patent is defined in the appended claims.

What is claimed is:

1. A bistable stage for use in an asynchronous timing chain including a plurality of similar stages, said stage in combination comprising:

a bistable storage flip-flop circuit alternatively switchable to a set and clear operating condition, said flip-flop including a first pair of cross-coupled logic circuits, a set input circuit, a clear input circuit, a set output circuit, and a clear output circuit;

a transfer-trap flip-flop circuit alternatively switchable to a set and clear operating condition, said transfer-trap flip-flop including a second pair of cross-coupled logic circuits and having a first output circuit coupled to said clear input circuit, and a first input circuit coupled to said set output circuit;

means for receiving set pulses coupled to said set input circuit;

means for receiving time-spaced advance pulses coupled to a second input circuit of said transfer-trap flip-flop; and additional means coupled to said first output circuit of said transfer-trap flip-flop for providing signals to a next subsequent timing chain stage indicative of the state of said storage flip-flop.

2. A stage for use in an asynchronous timing chain including a plurality of similar stages, said stage in combination comprising:

a first bistable storage flip-flop circuit alternatively switchable to a set and clear operating condition, said flip-flop including a first pair of cross-coupled logic circuits, a set input circuit, a clear input circuit, a set output circuit, and a clear output circuit;

a transfer-trap flip-flop circuit alternatively switchable to a set and clear operating condition, said transfer-trap flip-flop including a second pair of cross-coupled logic circuits and having a first output circuit of one of said second pair coupled to said clear input circuit and a first input circuit of the other of said second pair coupled to said set output circuit;

means for receiving set pulses coupled to said set input circuit;

means for receiving time-spaced advance pulses coupled to an input circuit of said one of said second pair of said transfer-trap flip-flop; and additional means coupled to said first output circuit of said one of said second pair for providing signals to a next subsequent timing chain stage indicative of the state of said storage flip-flop.

3. A stage as in claim 2 wherein each of logic circuits comprises a transistorized NOR logic circuit, alternatively operable in one of two stable conducting states in response to applied input signals.

4. A bistable stage for use in a scaling circuit having a plurality of like stages, said stage in combination comprising:

first and second pairs of two-state logic circuits, each of said circuits having multiple-input circuits and multiple-output circuits, said first pair alternatively operable in first and second indicating states;

means for coupling a first output circuit of one of said first pair to a first input circuit of the other of said first pair;

means for coupling a first input circuit of said one of the first pair to a first output circuit of the other of said first pair;

means for coupling a first output circuit of one of the second pair to a first input circuit of the other of said second pair;

means for coupling a first input circuit of said one of said second pair to a first output circuit of the other of said second pair;

means for coupling a second output circuit of said one of said first pair to a second input circuit of said one of said second pair;

means for coupling a second output circuit of said other of said second pair to a second input circuit of said one of said first pair;

means for receiving a set pulse coupled to second input circuit of the other of said first pair;

means for receiving an advance pulse coupled to a second input circuit of the other of said second pair;

means for coupling a third output circuit of the other of said second pair to a subsequent stage for providing a signal to a subsequent stage indicative of the indicating state of said first pair upon the receipt of a second advance pulse.

5. A bistable stage for use in an asynchronous timing chain, in combination comprising:

a bistable storage and indicating flip-flop circuit alternatively switchable to a set and a clear operating state, said flip-flop including a set input circuit, a clear input circuit, a set output circuit, and a clear output circuit;

a transfer-trap circuit for controlling the switching of said bistable flip-flop circuit, said transfer-trap circuit having a plurality of input circuits and a plurality of output circuits, including a first input circuit for receiving time-spaced advance pulse switching signals;

means for coupling a first transfer-trap circuit output circuit to said clear input circuit;

means for coupling said clear output circuit to a second input circuit of said transfer-trap circuit;

means for receiving a set input signal coupled to said set input circuit; and additional means coupled to said first output circuit of said transfer-trap circuit for providing signals to a subsequent stage indicative of the state of said bistable storage and indicating flip-flop.

6. An asynchronous counting circuit comprised of a plurality of stages, each stage capable of alternatively generating indicating and non-indicating signals, the circuit operating at any given time so that only one of the stages generates an indicating signal and all other stages generate non-indicating signals, said circuit comprising:

a plurality of bistable indicating stages, each stage including first and second pairs of two-state logic circuits, each of said circuits having multiple-input circuits and multiple-output circuits, means for coupling a first output circuit of one of said first pair to a first input circuit of the other of said first pair, means for coupling the first input circuit of said one of the first pair of a first output circuit of other of said first pair, means for coupling a first output circuit of one of the second pair to a first input circuit of the other of said second pair, means for coupling a first input circuit of said one of said second pair to a first output circuit of the other of said second pair, means for coupling a second output circuit of said one of said first pair to a second input circuit of said one of said second pair, means for coupling a second output circuit of said other of said second pair to a second input circuit of said one of said first pair;

means coupled to a second input circuit of the other logic circuits of the second pair of each of said stages for causing the indicating state of said first pair to propagate from stage to stage upon the application of individual time-spaced advance pulses;

means for intercoupling adjacent stages, each stage including means for coupling a third output circuit of the other of said second pair to a second input circuit of the other of a first pair in a subsequent stage, and means coupling a fourth output circuit of the other of said second pair to a third input circuit of the other logic circuit of the second pair in said next subsequent stage; and means coupled to the first pairs of each of said stages for setting said pairs in an initial operating condition.

7. A circuit as in claim 6 wherein each of said two-state logic circuits comprises a NOR logic circuit, said NOR logic circuit including a transistor having a base electrode, an emitter electrode, and a collector electrode, one of said electrodes being designated the control electrode, and a second of said electrodes being designated the output electrode, and a third electrode being undesignated, a bias network comprised of resistors including means for serially coupling said bias network between first and second voltage sources, said bias network for biasing said transistors into a first stable-state of conduction in the absence of any input signals, said bias network having first and second junction points, said first junction point coupled to said control electrode, a plurality of unidirectional current conducting means, each having first and second terminals, means for coupling like terminals of said unidirectional current conducting means to said second junction point of said bias network, a plurality of means for receiving input signals, each of said means for receiving coupled to respective different ones of the other of said like terminals of said unidirectional current conducting means, a limiting diode coupled between said output electrode and a source for receiving a third voltage level, means for coupling said undesignated electrode to a fourth voltage source, and load means coupled to the junction of the coupling of said output electrode and said limiting diode.

8. An asynchronous timing circuit comprised a plurality of stages, each stage capable of alternatively generating indicating and non-indicating signals, the circuit operating at any given time so that only one of the said stages generates an indicating signal and all other stages generate the non-indicating signal, said circuit comprising:

a plurality of bistable indicating stages, each stage including first and second pair of two-state logic circuits, each of said circuits having multiple-input circuits and multiple-output circuits, means for coupling a first output circuit of one of said first pair to a first input circuit of the other of said first pair, means for coupling the first input circuit of said one of the first pair to a first output circuit of other of said first pair, means for coupling a first output circuit of one of the second pair to a first input circuit of the other of said second pair, means for coupling a first input circuit of said one of said second pair to a first output circuit of the other of said second pair, means for coupling a second output circuit of said one of said first pair to a second input circuit of said one of said second pair, means for coupling a second output circuit of said other of said second pair to a second input circuit of said one of said first pair;

means for intercoupling adjacent stages, the intercoupling means for each stage including means for coupling a third output circuit of the other of said second pair to a second input circuit of the other of a first pair in a subsequent stage; and means coupling a fourth output circuit of the other of said second pair to a third input circuit of the other logic circuit of the second pair in said next subsequent stage;

means coupled to a third input circuit of the one logic circuit of the first pair in each stage for setting each of said pairs in an initial non-indicating condition;

means coupled to a second input circuit of the other logic circuit of the first pair of the first stage for receiving an initial set signal for causing said first stage to be switched to the indicating condition; and means for receiving time-spaced advance pulses coupled to a second input circuit of the other logic circuits of the second pairs of each of said stages for causing the indicating state of said first pair to propagate from stage to stage upon the application of time-spaced advance pulses.

9. A circuit as in claim 8 wherein each of said two-state logic circuits comprises a NOR logic circuit, alternatively operable in one of two stable conducting states in response to applied input signals.

10. A circuit as in claim 9 wherein each of said NOR logic circuits includes a transistor, a bias network coupled to said transistor, and a logic array of unidirectional current conducting means coupled to said bias network, the output signal derived from said transistor being depending on the input signals applied to said logic array of unidirectional current conducting means.

11. An asynchronous counting circuit including in combination:

*n*-bistable stages, where *n* is an integer greater than one, each of said stages alternatively switchable to a set and a clear operating condition;

*n*-transfer-trap circuits, where *n* is an integer greater than one, and where each of said transfer-trap circuits is alternatively switchable to one of two stable states, each of said transfer-trap circuits including an advance terminal for receiving advance pulses, each transfer-trap circuit being associated with a different bistable stage;

means for coupling a source of asynchronously sequentially occurring advance pulses to said advance terminals of said transfer-trap circuits;

circuits means for coupling each of said transfer-trap circuits except the *n*th stage, between different pairs of said bistable stages, said circuit means including stage-switching and stage-switching inhibiting pulse paths, each of said transfer-trap circuits operating to propagate the next subsequent advance pulse to the next stage when the bistable stage preceding it is in the set state and being operative to inhibit the transfer of the next advance pulse to the succeeding stage when the preceding stage is in the cleared operating state, the output signal from the transfer-trap circuit further operating to switch its associated bistable stages from the set to the cleared condition for those conditions when the advance pulse causes the next subsequent stage to be put in the set condition;

means for setting each of said stages to an initial operating condition; and means for initially setting a first of said stages in the set operating conditions.

12. The asynchronous counting circuit of claim 11 and further including means coupling the transfer-trap circuit of the *n*th stage to the first stage for providing end-around advancement of the switching operation.

13. A bistable stage for use in an asynchronous timing circuit having a plurality of like stages, said stage in combination comprising:

first and second pairs of two-state logic circuits, each of said circuits having a transistor alternatively stably operable in one of two conducting states, each of said transistors having a base electrode and means for coupling said base electrode to a first voltage source, a collector electrode and means for coupling said collector electrode to a second voltage source, and an emitter electrode and means for coupling said emitter electrode to a third voltage source, one of the named electrodes being further designated the output electrode, a second of the named electrodes being further designated a control electrode and a third named electrode being undesignated, and bias means coupled to said control electrode of said transistor respectively for causing each of said logic circuits to normally assume a first conducting state in the absence of input control signal;

means, including a first unidirectional current conducting means, for coupling the output electrode of one of the logic circuits of said first pair to the control electrode of the other logic circuit of said first pair;

means, including a second unidirectional current conducting means, for coupling the control electrode of said one of the logic circuits of said first pair to the output electrode of the other logic circuit of said first pair;

means, including a third unidirectional current conducing means, for coupling the output electrode of one of the logic circuits of said second pair to the control electrode of the other logic circuit of said second pair;

means, including a fourth unidirectional current conducting means, for coupling the control electrode of said one of the logic circuits of said second pair to the output electrode of the other logic circuit of said second pair;

means, including a fifth unidirectional current conducting means, for coupling the output electrode of said one of the logic circuits of said first pair to the control electrode of said one of the logic circuits of said second pair;

means, including a sixth unidirectional current conducting means, for coupling the output electrode of said other of the logic circuits of said second pair to the control electrode of said one of the logic circuits of said first pair;

means, including a seventh unidirectional current conducting means, for receiving a set pulse coupled to the control electrode of the other logic circuit of said first pair;

means, including an eighth unidirectional current conducting means, coupled to the control electrode of the other logic circuit of said second pair for receiving advance pulses;

means for coupling the output electrode of the other logic circuit of said second pair to a subsequent stage for causing an associated subsequent stage to be changed in state upon the receipt of a second advance pulse when the first said stage has previously been placed in the set condition.

References Cited

UNITED STATES PATENTS 3,041,476 6/1962 Parker ------------ 307—88.5

ARTHUR GAUSS, *Primary Examiner.*

J. ZAZWORSKY, *Assistant Examiner.*

UNITED STATES PATENT OFFICE

CERTIFICATE OF CORRECTION

Patent No. 3,384,761 March 21, 1968

Wayne R. Olson et al.

It is certified that error appears in the above identified patent and that said Letters Patent are hereby corrected as shown below:

Column 12, line 61, "of", second occurrence, should read -- to --. Column 13, line 41, after "comprised" insert -- of --. Column 14, line 20, "couplied" should read -- coupled --.

Signed and sealed this 14th day of October 1969.

(SEAL)
Attest:

Edward M. Fletcher, Jr.
Attesting Officer

WILLIAM E. SCHUYLER, JR.
Commissioner of Patents